(12) United States Patent
Kolb

(10) Patent No.: US 11,269,503 B2
(45) Date of Patent: Mar. 8, 2022

(54) VEHICLE SEAT WITH SEAT OPERATING DEVICE

(71) Applicant: GRAMMER AG, Amberg (DE)

(72) Inventor: Jens Kolb, Königstein (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/510,155

(22) Filed: Jul. 12, 2019

(65) Prior Publication Data

US 2020/0019301 A1 Jan. 16, 2020

(30) Foreign Application Priority Data

Jul. 13, 2018 (DE) .......................... 102018117006.8

(51) Int. Cl.
| | |
|---|---|
| *G06F 3/0484* | (2013.01) |
| *G06F 3/04847* | (2022.01) |
| *B60N 2/02* | (2006.01) |
| *G06F 3/023* | (2006.01) |
| *G06F 3/04883* | (2022.01) |
| *B60K 35/00* | (2006.01) |

(52) U.S. Cl.
CPC ....... *G06F 3/04847* (2013.01); *B60N 2/0228* (2013.01); *B60N 2/0296* (2013.01); *G06F 3/023* (2013.01); *G06F 3/04883* (2013.01); *B60K 35/00* (2013.01)

(58) Field of Classification Search
CPC .. G06F 3/04847; G06F 3/023; G06F 3/04883; B60K 2370/145; B60K 2370/146; B60W 50/16; G05G 5/03
See application file for complete search history.

(56) References Cited

U.S. PATENT DOCUMENTS

| | | | |
|---|---|---|---|
| 9,079,510 B2 | 7/2015 | Huber | |
| 10,513,210 B2* | 12/2019 | Gomez | ................... B60N 2/793 |
| 2006/0171675 A1* | 8/2006 | Kolletzki | ........... H04N 5/44543 |
| | | | 386/230 |
| 2009/0096258 A1* | 4/2009 | Kim | ....................... B60K 35/00 |
| | | | 297/188.17 |

(Continued)

FOREIGN PATENT DOCUMENTS

| | | |
|---|---|---|
| CN | 103029599 | 4/2013 |
| CN | 104898922 | 9/2015 |

(Continued)

OTHER PUBLICATIONS

Extended Search Report for European Patent Application No. 19185426.4, dated Dec. 2, 2019, 4 pages.

(Continued)

*Primary Examiner* — Nicholas Klicos

(74) *Attorney, Agent, or Firm* — Sheridan Ross P.C.

(57) ABSTRACT

A vehicle seat having a seat operating device, wherein the seat operating device has a touch screen for displaying control panels for setting a value of an operating parameter assigned to the respective control panel and for detecting user input, wherein one can toggle between control panels via at least one first user input, wherein the control panels are arranged in a fixed order, wherein each a individual control panel is displayed by the touch screen and the value of the operating parameter can be changed by at least a second user input in the control panel.

20 Claims, 4 Drawing Sheets

(56) References Cited

U.S. PATENT DOCUMENTS

| | | | | |
|---|---|---|---|---|
| 2009/0241072 | A1* | 9/2009 | Chaudhri | G06F 3/04883 |
| | | | | 715/863 |
| 2010/0131642 | A1* | 5/2010 | Chalikouras | G06Q 30/0241 |
| | | | | 709/224 |
| 2010/0176632 | A1* | 7/2010 | Alford | B64D 11/0624 |
| | | | | 297/217.3 |
| 2010/0318266 | A1* | 12/2010 | Schaaf | B60K 35/00 |
| | | | | 701/49 |
| 2014/0309870 | A1* | 10/2014 | Ricci | G06F 9/451 |
| | | | | 701/36 |
| 2015/0347075 | A1* | 12/2015 | Levesque | G06F 3/016 |
| | | | | 345/3.1 |
| 2016/0004362 | A1* | 1/2016 | Kring | B60N 2/0228 |
| | | | | 345/174 |
| 2016/0193976 | A1* | 7/2016 | Wild | G06F 3/04883 |
| | | | | 701/36 |
| 2016/0216830 | A1* | 7/2016 | Olien | G06F 3/041 |
| 2017/0015217 | A1 | 1/2017 | Pike et al. | |
| 2017/0057380 | A1* | 3/2017 | Vikstrom | B60N 2/12 |
| 2017/0078465 | A1* | 3/2017 | Ito | H04M 1/6075 |
| 2017/0124987 | A1* | 5/2017 | Kim | B60R 11/04 |
| 2017/0166056 | A1* | 6/2017 | Buttolo | B60K 37/06 |
| 2018/0001789 | A1 | 1/2018 | Cengil et al. | |
| 2018/0024695 | A1* | 1/2018 | Iyer | B60K 35/00 |
| | | | | 345/175 |
| 2018/0029502 | A1* | 2/2018 | Georgiev | G06F 3/0338 |
| 2018/0088770 | A1* | 3/2018 | Brombach | G06F 3/0488 |
| 2018/0181235 | A1* | 6/2018 | Rihn | G06F 3/011 |
| 2019/0294251 | A1* | 9/2019 | Chen | G06F 7/00 |

FOREIGN PATENT DOCUMENTS

| | | |
|---|---|---|
| CN | 105620316 | 6/2016 |
| DE | 19725175 | 12/1998 |
| DE | 102007039442 | 2/2009 |
| DE | 102011081098 | 2/2013 |
| DE | 102014016570 | 5/2016 |
| DE | 102016011307 | 3/2018 |
| EP | 2735469 | 5/2014 |
| EP | 3040245 | 7/2016 |
| EP | 3263392 | 1/2018 |
| JP | 2013-014212 | 1/2013 |
| KR | 10-1273616 | 6/2013 |
| KR | 10-2015-0106590 | 9/2015 |
| WO | WO 2010/080178 | 7/2010 |
| WO | WO 2013/005093 | 1/2013 |
| WO | WO 2016/202863 | 12/2016 |

OTHER PUBLICATIONS

Official Action for German Patent Application No. 102018117006.8, dated Feb. 28, 2019, 3 pages.
Official Action for German Patent Application No. 102018117006.8, dated Oct. 2, 2020, 4 pages.
Official Action with Machine Translation for European Patent Application No. 19185426.4, dated Nov. 12, 2020, 8 pages.
Official Action with English Translation for China Patent Application No. 201910635544.8, dated Jul. 1, 2021, 24 pages.

* cited by examiner

VEHICLE SEAT WITH SEAT OPERATING DEVICE

CROSS-REFERENCE TO RELATED APPLICATIONS

This application claims the benefit of German Patent Application No. 10 2018 117 006.8 filed Jul. 13, 2018, the entire contents of which are incorporated herein by reference.

FIELD

The invention relates to a vehicle seat with a seat operating device.

BACKGROUND

There are seat operating devices known from the prior art which in particular have mechanical actuators such as switches, buttons, or the like, which are assigned a specific function, respectively, for example, increasing and decreasing the amount of air in an air spring of the vehicle seat.

Due to the use of mechanical actuators, a plurality of actuators is necessary to cover the intended seat adjustment options and to be able to change them accordingly.

SUMMARY

It is therefore an object of the present invention to reduce the number of actuators and to provide a simpler and more compact adjustability of the respective vehicle functions.

An essential point of the invention is to provide a vehicle seat with a seat operating device, wherein the seat operating device comprises a touch screen for displaying control panels for setting a value of an operating parameter assigned to the respective control panel and for detecting a user input, wherein one can toggle between control panels by means of at least one first user input, wherein the control panels are arranged in a fixed sequence, wherein a single control panel is displayed at a time by the touch screen and the value of the operating parameter may be changed by a second user input in the control panel.

In particular, the seat operating device is connected to the vehicle seat.

According to the invention, always exactly one control panel is displayed by means of the touch screen through which the value of an operating parameter assigned to the control panel may be changed by a first user input.

A seat height adjustment, and a vertical seat cushioning, a seat longitudinal adjustment, a backrest tilt, and a seat tilt are named as examples of a control panel. The same is displayed by the control panel on the touch screen.

In particular, only one setting is represented by an control panel, so, for example, seat height adjustment by a first control panel, seat cushioning by a second control panel, etc. Further according to the invention, one can toggle between, that is switch between, the respective control panels by a first user input. Further according to the invention, the control panels are arranged in a fixed sequence, that is, the control panels are displayed sequentially in a particular pattern, wherein the order can be expanded if necessary and in particular the order can be changed before use, according to the needs of the driver.

A fixed order is advantageous in that through the at least one first user input the driver can change between the control panels and reach the desired control panel after a certain number of first user inputs without eye contact.

After a control panel has been selected, the value of the operating parameter assigned to the control panel may be changed by means of the at least one second user input.

In particular, the first and second user inputs are different from each other.

According to one preferred embodiment, the first user input is a swiping movement. In particular, this swiping movement is a movement on the screen, particularly advantageously along a horizontal line on the screen, that is to say simply a movement from left to right or vice versa.

According to one further preferred embodiment, the second user input is a tapping movement. In particular, the control panel has one or more sensitive key areas for this purpose. If a tapping movement is executed on one of the key areas, the operating parameter is changed depending on this input.

According to one further preferred embodiment, the seat operating device comprises an activation button, wherein a first activation signal can be sent to the touch screen by actuation of the activation button, whereby the touch screen can be unlocked and a first control panel selected from the group of control panels is displayed on the touch screen. An activation button is particularly advantageous when the touch screen and accordingly the control panels are located in environments in which an inadvertent touch or actuation by the driver cannot be precluded.

However, if the touch screen is located in an environment in which such inadvertent operation by the operator may be precluded or nearly precluded, an activation button may be dispensed with, and the seat operating device is active at least during use of the vehicle or vehicle seat. The touch screen is arranged so as to preclude inadvertent operation.

For example, the touch screen may be arranged in little used or unused areas of the vehicle seat or the vehicle cabin. It is also conceivable that the touch screen may be arranged by recessed, offset or planar embedding in surfaces of the vehicle seat. Recessed embedding, for example in an armrest, may prevent inadvertent operation by an arm or the like of the driver. The same applies equally to offset or planar embedding.

The activation button may be designed as part of the touch screen. In particular, the activation button is haptically distinguishable from the sensitive area of the touch screen. The activation button may be a mechanical button or switch, but it is also conceivable that the activation button also has a sensitive area.

According to one other preferred embodiment, the seat operating device is constantly activated with the touch screen being constantly illuminated. For the purposes of the invention, this means that the seat operating device is active as long as the vehicle and/or the vehicle seat is actively used. If the vehicle is deactivated or the vehicle seat is not occupied, the seat operating device is likewise deactivated.

According to one alternative preferred embodiment, the touch screen is illuminated upon actuation of the activation button.

Illuminated here means, for example, that the touch screen has a backlight to illuminate the touch screen.

According to one further preferred embodiment, the seat operating device has an electronic control unit, by means of which the control panel displayed on the touch screen is linked at least through a signal to the actuator associated with the control panel and the corresponding operating parameter.

This means, for example, that a corresponding first control signal is transmitted to the electronic control unit by a user input on the touch screen, wherein a corresponding second control signal is transmitted to the actuator by means of the control unit to control the actuator in accordance with the user input.

In particular, the activation button is also connected to the control unit, wherein it is conceivable that the first activation signal is transmitted by the control unit to the touch screen by the actuation of the activation button.

According to one further preferred embodiment, after switching between control panels after a predetermined first duration, an identification signal can be transmitted from the touchscreen to the control unit, wherein after receipt of the identification signal at the control unit a second activation signal is sent to the actuator belonging to the control panel to activate the actuator for a short time.

This means that after selecting an control panel and after a predetermined first duration, an identification signal is transmitted from the touch screen to the control unit, wherein the control unit indicates which control panel is currently selected by means of the identification signal. After the control unit has received this identification signal and has been informed which control panel is selected, the control unit transmits the second activation signal to the actuator associated with the selected control panel, whereby the actuator is briefly activated.

Briefly is understood to mean a time duration of less than 5 seconds, more preferably less than 2 seconds, and particularly preferably not more than 1 second, and more preferably not more than 0.5 seconds.

This brief activation creates additional feedback for the driver, so that the driver can recognize without eye contact to the touch screen which control panel is currently selected and, in particular, which operating parameter can be set thereby.

According to one further preferred embodiment, it is advantageous if after a predetermined second duration, a deactivation signal is sent to the touch screen by the control unit, whereby the touch screen is automatically deactivated.

This means that if the driver does not want to make any more adjustments or has already made all adjustments to the vehicle seat, the touch screen is automatically deactivated and therefore cannot be operated unintentionally. In particular, the driver does not have to perform any manual deactivation of the touch screen, so that increased comfort in the operation of the seat operating device can be ensured.

The second duration is preferably not more than 5 minutes, more preferably 2 minutes and particularly preferably not more than 1 minute.

According to one other preferred embodiment, after a predetermined third duration, a reset signal has been sent to the touch screen by the control unit, whereby the control panel displayed first is displayed.

After activating the seat operating device, regardless of how it was activated, a first control panel is initially displayed on the touch screen. By adjusting or switching between the control panels, it may happen that the driver has forgotten which function was last adjusted. It therefore makes sense that after the third duration, the first displayed control panel is displayed again by sending the reset signal to the touch screen.

The third duration is preferably at least one minute, preferably at least 2 minutes, more preferably at least 5 minutes and particularly preferably at least 10 minutes.

In particular, the first as well as the second duration may begin from the point an control panel is selected.

According to one further preferred embodiment, the touch screen is arranged in or on an armrest of the vehicle seat or in a seat section of the vehicle seat.

In particular, an arrangement of the touch screen is provided in an area which is little used or which is otherwise unused. Examples include a little used area of an armrest, or a front, central area of the seat section that is arranged between the two legs of the driver.

The underlying object is also achieved by a method comprising the steps:
(a) activating a seat operating device by operating an activation button and displaying a first control panel on a touch screen, the first control panel being selected from a group of different control panels;
(b) using the first control panel or selecting a second control panel by at least a first user input and displaying the second control panel on the touch screen;
(c) changing a value of an operating parameter assigned to the first or second control panel by at least one second user input.

Further advantageously, it is a seat operating device as described above.

Alternatively, the object is further achieved by a vehicle seat with a seat operating device, wherein the seat operating device comprises a touch screen for displaying control panels for setting a value of an operating parameter assigned to the respective control panel and for detecting user inputs, wherein one can switch between control panels by means of at least one first user input, wherein the control panels are arranged in a fixed sequence, wherein a single control panel at a time is displayed by the touch screen and the value of the operating parameter can be changed by at least a second user input via at least one input button of the vehicle seat.

In this case, the at least one input button is connected by signals to the touch screen such that the value of the operating parameter can be changed as a function of the actuation of the input button by pressing the input button.

Furthermore, it is altogether conceivable that not only a single value of the control panel is can be changed, but that two, three or even four values can be changed.

For example, it is conceivable that both the seat height and the seat longitudinal adjustment can be dependently or independently changed.

Further advantageous embodiments result from the dependent claims.

BRIEF DESCRIPTION OF THE DRAWINGS

Additional objects, advantages and expedient uses of the present invention can be found in the following description in conjunction with the drawings. In the drawings.

DETAILED DESCRIPTION

Figure 1:
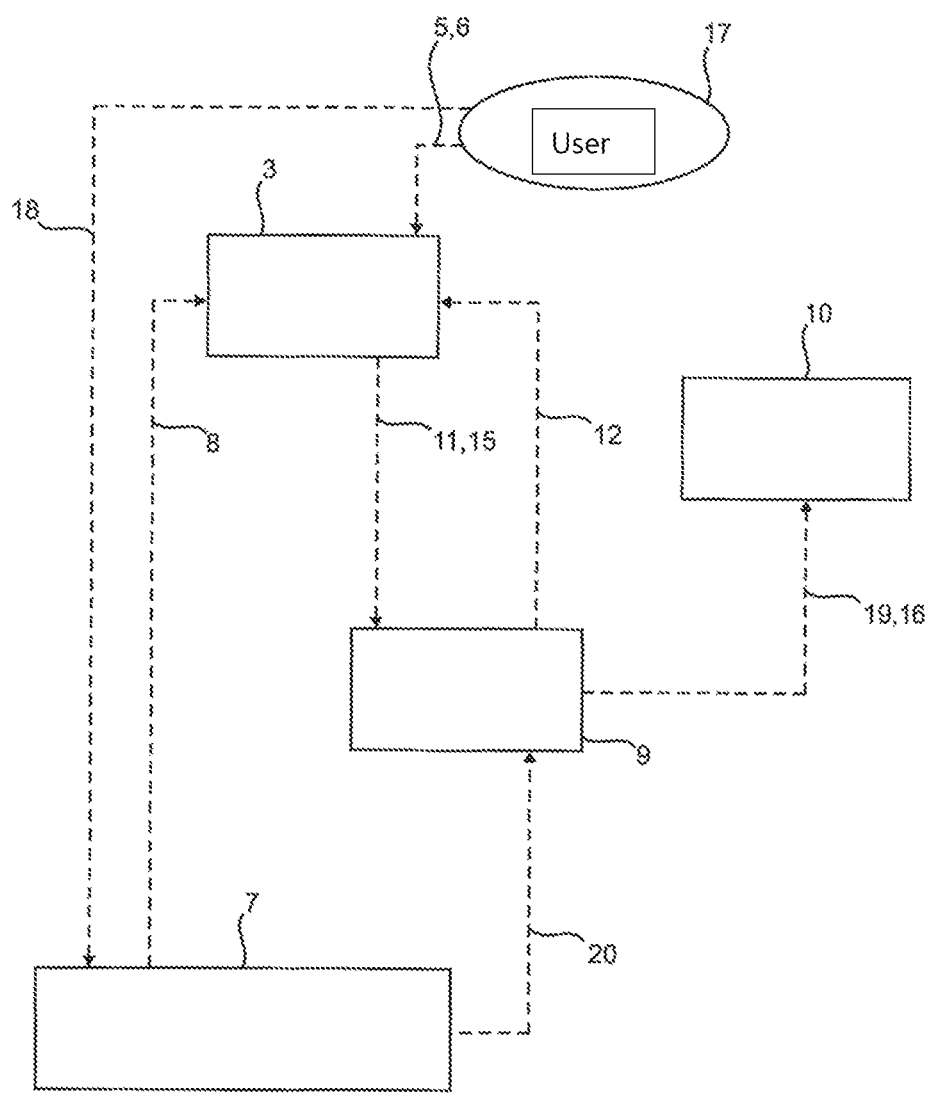
FIG. 1 shows a seat operating device according to one preferred embodiment.

FIG. 1 shows a seat operating device 2 according to one particularly preferred embodiment. It can also be seen how the respective components are interconnected by signals.

As can be seen, the seat operating device 2 comprises a touch screen 3, a control unit 9, an activation button 7 and at least one actuator 10.

By means of a user 17, an input can be made on the touch screen 3 by means of user inputs 5, 6. Depending on how this user input is formed, another function is controlled. If the user input is a first user input 5, the user 17 preferably executes a swiping movement. If the user input is a second user input 6, then the user 17 preferably executes a tapping movement.

Due to an operation 18 of the activation button 7, a first activation signal 8 is transmitted to the touch screen 3, whereby the touch screen 3 is unlocked, meaning activated, and an control panel 4 (not shown here) is displayed on the touch screen 3.

Due to user inputs 5, 6 of the user 17 on the touch screen 3, a first control signal 15 is transmitted from the touch screen 3 to the control unit 9. The control unit 9 is thereby informed as to which user input 5, 6 it is and how often or to what extent such a user input 5, 6 is made.

Further, after switching between control panels 4, an identification signal 11 can be transmitted from the touch screen 3 to the control unit 9, in particular after a predetermined first duration, wherein after receipt of the identification signal 11 at the control unit a second activation signal 19 is sent to the actuator 10 associated with the selected control panel 4 to activate this actuator 10 for a short time and to thus transmit to the user a haptic response about the currently selected control panel 4 or the operating parameters currently to be adjusted.

It is also conceivable that only one connection from the control unit 9 is made to the actuator 10, and a control of the actuator 10 is performed by the control unit 9 based on the corresponding second user inputs.

In addition, it is conceivable that upon actuation 18 of the activation button 7, a test signal 20 is transmitted from the activation button 7 to the control unit 9 to carry out a check when transmitting a signal, in particular a first control signal 15 from the touch screen 3 to the control unit 9, wherein it is determined by the check whether the first control signal 15 actually comes from the touch screen 3 or not.

Figure 2:
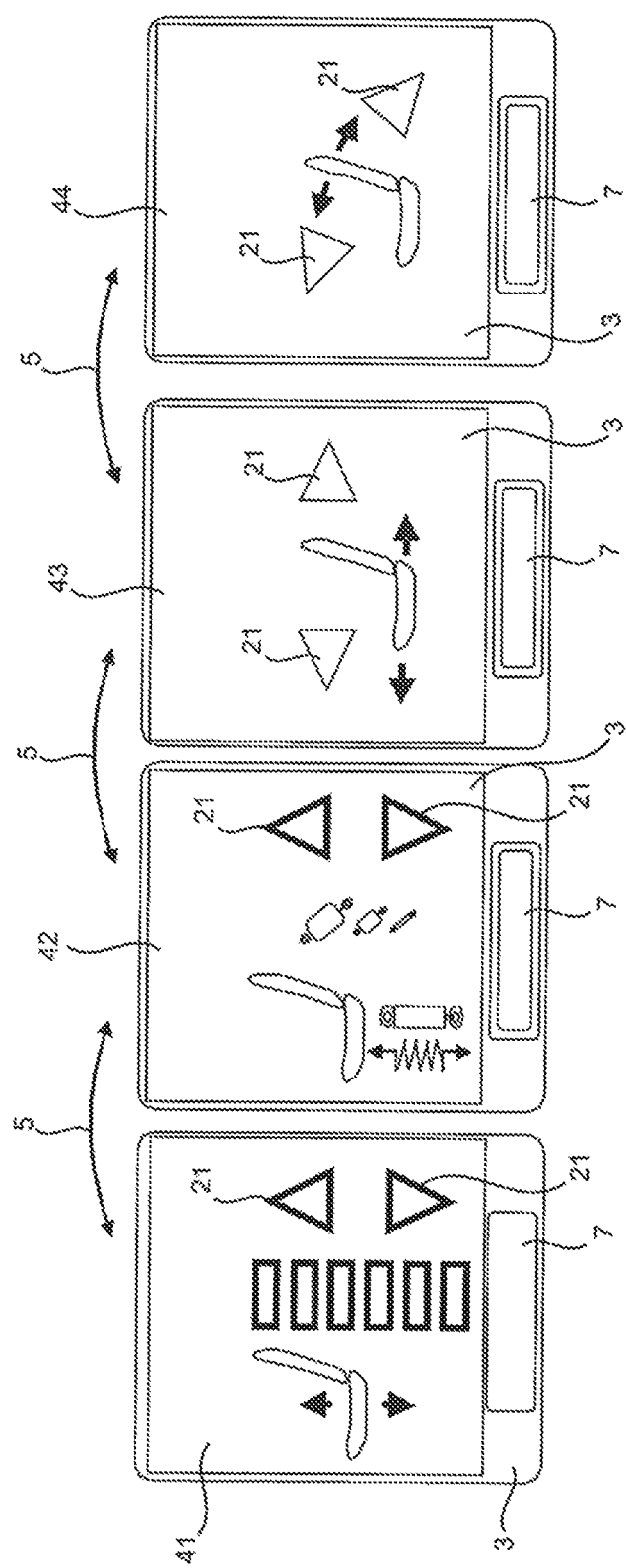
FIG. 2 shows a switching between the control panels.

FIG. 2 shows a change or a toggling between different control panels 4, wherein a first control panel 41, a second control panel 42, a third control panel 43 and a fourth control panel 44 can be seen. Of course, fewer control panels 4 or more control panels 4 may be present, wherein at least two control panels 4 are advantageous.

As can further be seen, the control panels 4, 41, 42, 43, 44 are displayed by means of a touch screen 3, wherein in the present case the activation button 7 is designed as part of the touch screen 3.

A seat height adjustment is displayed by the first control panel 41, a vertical seat cushioning by the second control panel 42, a seat longitudinal adjustment by the third control panel 43, and a backrest tilt by the fourth control panel 44.

Figure 4:
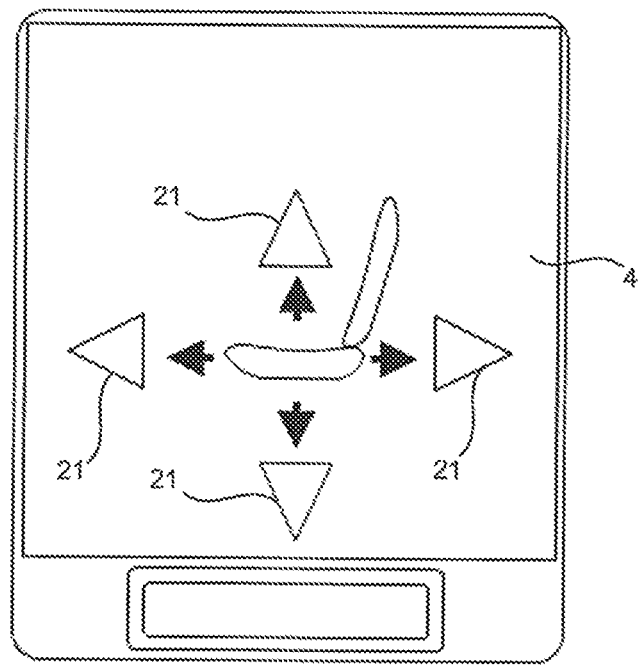
FIG. 4 shows an alternative display of an control panel.

It can also be seen in FIG. 4 that the respective control panels 4, 41, 42, 43, 44 have at least one sensitive area 21, in particular a sensitive key area 21, wherein a corresponding change of the operating parameter is made with a second user input 5, in particular a tapping movement on a key area 21.

It can also be seen that it is possible to switch back and forth between the control panels 4, 41, 42, 43, 44 by means of first user inputs 5, wherein the first user input 5 in the present case is a swiping movement.

It is also conceivable that the second user input 6 is also a swiping movement.

Figure 3C:
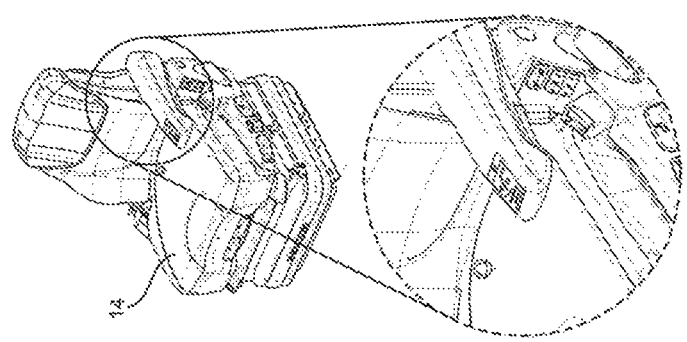
FIG. 3C shows a third arrangement of the touch screen.
Figure 3B:
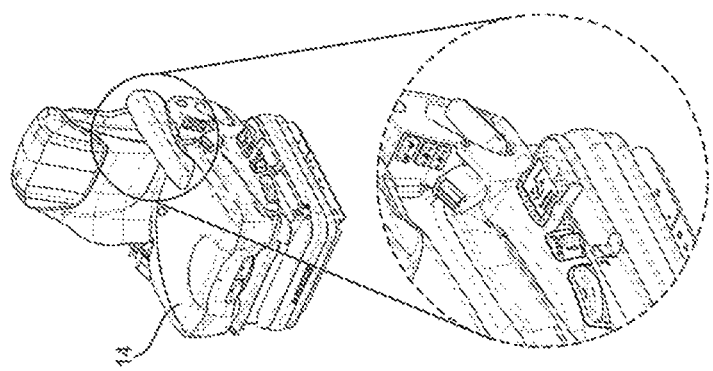
FIG. 3B shows a second arrangement of the touch screen.
Figure 3A:
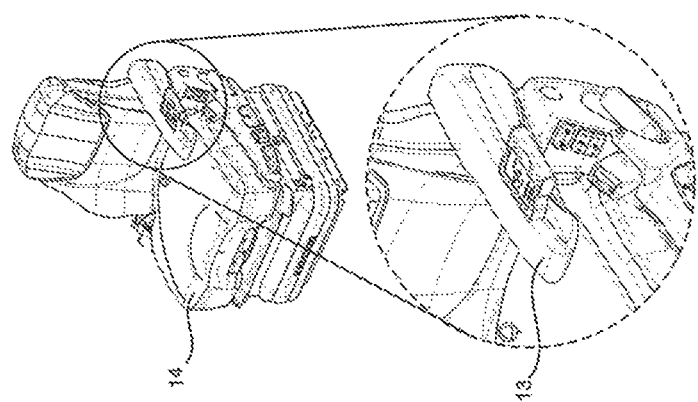
FIG. 3A shows a first arrangement of the touch screen.

FIGS. 3A, 3B and 3C also show various attachment possibilities for the touch screen 3 with or on a vehicle seat 1, as shown in more detail below.

In FIG. 3A, the touchscreen 3 is arranged on an armrest 13, in particular on a lateral surface 22 of the armrest 13.

In FIG. 3B, the touchscreen 3 is arranged on a seat section 14, in particular on a lateral surface of the seat section 14, and particularly preferably below the armrest 13.

In FIG. 3C, the touch screen 3 is integrated in the armrest 13, and it is conceivable that the touch screen 3 is recessed in the armrest, so that a vehicle driver is not disturbed by it.

FIG. 4 shows an alternative representation of a control panel 4, in which values of two different operating parameters can be set. In the present case, this is a seat height adjustment, represented by the up and down arrows, and a seat longitudinal adjustment, represented by arrows to the left and to the right.

Figure 5:
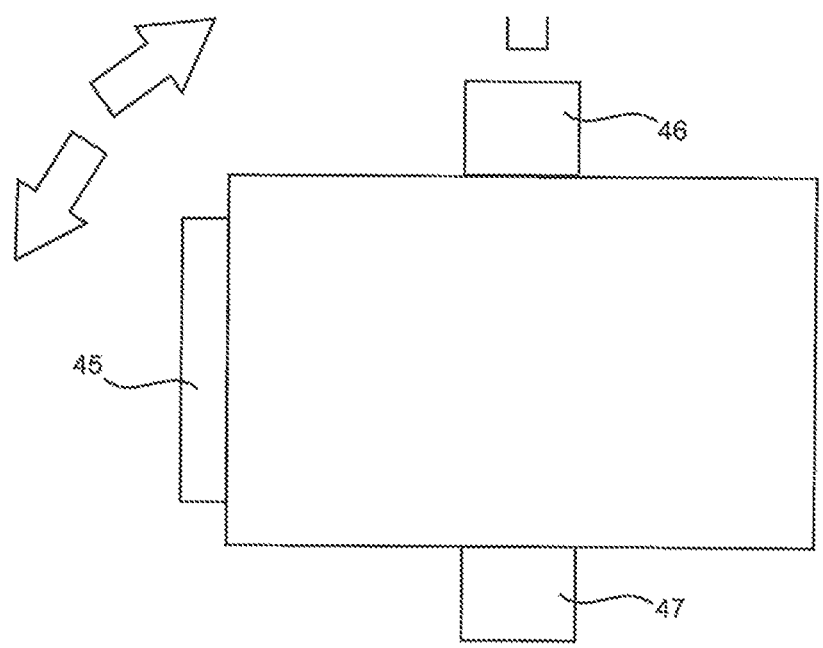
FIG. 5 shows an embodiment of the seat operating device.

FIG. 5 shows a further embodiment of the seat operating device 2, wherein various input buttons 45, 46, 47 can be seen, wherein, for example, a first input button 45 is provided for setting a seat inclination, a second input button 46 for increasing the seat height and a third input button 47 for reducing the seat height. The functions are exemplified by the respective arrows.

All the features disclosed in the application documents are claimed as being essential to the invention, provided that, individually or in combination, they are novel over the prior art.

LIST OF REFERENCE SIGNS

1 Vehicle seat
2 Seat operating device
3 Touch screen
4 Operating field
5 First user input
6 Second user input
7 Activation button
8 First activation signal
9 Control unit
10 Actuator
11 Identification signal
12 Deactivation signal
13 Armrest
14 Seat section
15 First control signal
16 Second control signal
17 User
18 Actuation
19 Second activation signal
20 Test signal
21 Sensitive area
22 Lateral surface
41 First control panel
42 Second control panel
43 Third control panel
44 Fourth control panel
45 Input button
46 Input button
47 Input button

What is claimed is:

1. A vehicle seat, comprising:
a plurality of mechanical actuators within the vehicle seat, each actuator of the plurality of mechanical actuators responsive to an operating parameter of the vehicle seat; and
a seat operating device, wherein the seat operating device includes a touch screen for displaying control panels for setting a value of the operating parameter of the vehicle seat, wherein the operating parameter is assigned to a respective control panel, and for detecting user input, wherein a user can switch between control panels by at least one first user input, wherein the control panels are arranged in a fixed sequence, wherein a single control panel at a time is displayed by the touch screen, wherein the value of the operating parameter assigned to a displayed control panel can be changed by providing an actuation signal to an actuator of the plurality of mechanical actuators that is operable to respond to a change in the operating parameter assigned to the displayed control panel in response to at least one second user input entered using the control panel, wherein the seat operating device further includes an electronic control unit, wherein the electronic control unit links the displayed control panel to the actuator of the plurality of mechanical actuators associated with the displayed control panel and a corresponding operating parameter, wherein, in response to a switching between control panels, an identification signal is transmitted from the touch screen to the electronic control unit to identify a currently displayed control panel, and wherein after receipt of the identification signal by the electronic control unit, and prior to receipt of an instance of a second user input entered using the currently displayed control panel, the electronic control unit sends an activation signal to the actuator of the plurality of mechanical actuators associated with the currently displayed control panel to briefly activate the actuator of the plurality of mechanical actuators associated with the currently displayed control panel.

2. The vehicle seat according to claim 1, wherein the first user input is a swiping movement.

3. The vehicle seat according to claim 1, wherein the second user input is a tapping movement.

4. The vehicle seat according to claim 1,
wherein the seat operating device comprises an activation button, and
wherein by actuation of the activation button a first activation signal can be sent to the touch screen, whereby the touch screen can be unlocked and a first control panel selected from a group of control panels is displayed on the touch screen.

5. The vehicle seat according to claim 4, wherein after pressing the activation button, the touch screen is illuminated.

6. The vehicle seat according to claim 4, wherein after a predetermined second duration, a deactivation signal has been sent to the touch screen by the electronic control unit, whereby the touch screen is automatically deactivated.

7. The vehicle seat according to claim 4, wherein after a predetermined third duration a reset signal has been sent to the touch screen by the electronic control unit, whereby the first control panel is displayed.

8. The vehicle seat according to claim 1,
wherein the seat operating device is constantly activated, and
wherein the touch screen is constantly illuminated.

9. The vehicle seat according to claim 1, wherein the touch screen is arranged in or on an armrest of the vehicle seat or in a seat section of the vehicle seat.

10. The vehicle seat according to claim 1, wherein the operating parameter is at least one of a seat height, a spring rate, a seat before and after position, and a seat back angle.

11. The vehicle seat according to claim 10, wherein the actuator of the plurality of mechanical actuators controls at least one of the seat height, the spring rate, the seat before and after position, and the seat back angle.

12. The vehicle seat according to claim 1, wherein the user can select one of the control panels for display by the touch screen in response to at least one first user input.

13. The vehicle seat according to claim 1, wherein the identification signal identifies a control panel that is displayed by the touch screen after switching between control panels.

14. A method, comprising:
activating a seat operating device by pressing an activation button and displaying a first control panel selected from a group of various control panels on a touch screen;
using the first control panel or selecting a second control panel by at least a first user input and displaying the second control panel on the touch screen; and
changing a value of an operating parameter associated with the seat operating device assigned to the first or second control panel by at least one second user input,
wherein the seat operating device includes an electronic control unit,
wherein the electronic control unit links the first control panel to a first mechanical actuator disposed within a vehicle seal,
wherein the first mechanical actuator is associated with the first control panel and responsive to the first operating parameter corresponding to the first control panel,
wherein, in response to a switching from the first control panel to the second control panel and after a predetermined first duration, an identification signal is transmitted from the touch screen to the electronic control unit,
wherein after receipt of the identification signal by the electronic control unit, and prior to receipt of a second user input, an activation signal is sent to a second mechanical actuator disposed within the vehicle seat and associated with the second control panel to briefly actuate the second mechanical actuator to cause a change in the vehicle seat.

15. The method according to claim 14, wherein the operating parameter is at least one of a seat height, a spring rate, a seat before and after position, and a seat back angle.

16. The method according to claim 15, wherein the first mechanical actuator controls at least one of the seat height, the spring rate, the seat before and after position, and the seat back angle.

17. The method according to claim 14, wherein the touch screen is arranged in or on an armrest of the vehicle seat or in a seat section of the vehicle seat.

18. A vehicle seat, comprising:
a seat operating device,
wherein the seat operating device has a touch screen for displaying a plurality of control panels for setting a value of a respective control panel associated with an operating parameter of the vehicle seat and for detecting user inputs,
wherein one can toggle between the plurality of control panels in response to at least one first user input,
wherein the plurality of control panels are arranged in a fixed sequence, wherein a single control panel at a time is displayed by the touch screen and the value of the operating parameter associated with the displayed control panel can be changed by at least one second user input via at least one input button of the vehicle seat, wherein the seat operating device includes an electronic control unit, wherein the electronic control unit links the displayed control panel to a first mechanical actuator of a plurality of mechanical actuators, each of the plurality of mechanical actuators located within the vehicle seat and are associated with the displayed control panel and are responsive to a corresponding first operating parameter, wherein the displayed control panel is the respective control panel of the plurality of control panels, each of the plurality of control panels associated with at least one mechanical actuator of the plurality of mechanical actuators, wherein, in response to and a predetermined time after switching between each of the plurality of control panels, an identification signal uniquely associated with the respective control panel displayed after the switching is sent from the touch screen to the electronic control unit, and wherein, after receipt of the identification signal by the electronic control unit, and prior to receipt of a second user input, the electronic control unit sends an activation signal to briefly activate the first mechanical actuator associated with the displayed control panel.

19. The vehicle seat according to claim 18, wherein the operating parameter is at least one of a seat height, a spring rate, a seat before and after position, and a seat back angle.

20. The vehicle seat according to claim 19, wherein the first mechanical actuator controls at least one of the seat height, the spring rate, the seat before and after position, and the seat back angle.

* * * * *